(12) United States Patent
Imbrogno et al.

(10) Patent No.: US 10,672,099 B2
(45) Date of Patent: Jun. 2, 2020

(54) MEMORY CACHE MANAGEMENT FOR GRAPHICS PROCESSING

(71) Applicant: Apple Inc., Cupertino, CA (US)

(72) Inventors: Michael Imbrogno, San Jose, CA (US); Ryan D. Schmitt, San Jose, CA (US)

(73) Assignee: Apple Inc., Cupertino, CA (US)

( * ) Notice: Subject to any disclaimer, the term of this patent is extended or adjusted under 35 U.S.C. 154(b) by 55 days.

(21) Appl. No.: 15/996,312

(22) Filed: Jun. 1, 2018

(65) Prior Publication Data
US 2019/0370929 A1  Dec. 5, 2019

(51) Int. Cl.
| | |
|---|---|
| *G06T 1/20* | (2006.01) |
| *G06T 1/60* | (2006.01) |
| *G06F 12/0802* | (2016.01) |
| *G06F 9/50* | (2006.01) |
| *G06F 12/0891* | (2016.01) |

(52) U.S. Cl.
CPC .............. *G06T 1/60* (2013.01); *G06F 9/5016* (2013.01); *G06F 12/0802* (2013.01); *G06F 12/0891* (2013.01); *G06T 1/20* (2013.01); *G06F 2201/885* (2013.01); *G06F 2212/1016* (2013.01); *G06F 2212/455* (2013.01)

(58) Field of Classification Search
None
See application file for complete search history.

(56) References Cited

U.S. PATENT DOCUMENTS

| | | | |
|---|---|---|---|
| 5,915,262 A | 6/1999 | Bridgers | |
| 6,681,296 B2 | 1/2004 | Liao | |
| 8,237,723 B2 * | 8/2012 | Swift | ........................ G06T 1/20 345/530 |
| 8,810,591 B2 | 8/2014 | Stauffer | |
| 8,928,680 B1 | 1/2015 | Sanketi | |
| 9,824,026 B2 | 11/2017 | Dong | |
| 2004/0162961 A1 | 8/2004 | Lyon | |
| 2012/0272011 A1* | 10/2012 | Carrie | ................. G06F 11/3466 711/146 |

(Continued)

OTHER PUBLICATIONS

Cloudflare Support, "How to Purge Cache Using Cache-Tags [Enterprise only]," retrived from the Internet: URL: https://support.cloudflare.com/hc/en-us/articles/206596608-How-to-Purge-Cache-Using-Cache-Tags-Enterprise-only—[retrieved on Mar. 8, 2018].

*Primary Examiner* — Joni Hsu
(74) *Attorney, Agent, or Firm* — Blank Rome LLP

(57) ABSTRACT

Systems, methods, and computer readable media to manage memory cache for graphics processing are described. A processor creates a resource group for a plurality of graphics application program interface (API) resources. The processor subsequently encodes a set command that references the resource group within a command buffer and assigns a data set identifier (DSID) to the resource group. The processor also encodes a write command within the command buffer that causes the graphics processor to write data within a cache line and mark the written cache line with the DSID, a read command that causes the graphics processor to read data written into the resource group, and a drop command that causes the graphics processor to notify the memory cache to drop, without flushing to memory, data stored within the cache line.

20 Claims, 8 Drawing Sheets

(56) References Cited

U.S. PATENT DOCUMENTS

2013/0229848 A1* 9/2013 Vogelsang ............. G11C 5/025
                                                    365/63
2015/0348225 A1   12/2015 Schreyer
2016/0247248 A1*  8/2016 Ha ........................ G06F 9/455

\* cited by examiner

| APPLICATION A 970 | PHOTOS 971 | QUICKEN 972 | IMOVIE 973 | APPLICATION B 974 |
|---|---|---|---|---|
| | ⏟ 975 | | | |
| OTHER APPLICATION SERVICES 960 | SPRITE KIT 961 | SCENE KIT 962 | CORE ANIMATION 963 | CORE GRAPHICS 964 |
| | ⏟ 980 | | | |
| O/S SERVICES 950 | OPENGL OR OPENCL 951 | METAL 952 | USER SPACE DRIVERS 953 | SOFTWARE RASTERIZER 954 |
| | ⏟ 985 | | | |
| O/S KERNEL 945 | | | | |
| | ⏟ 990 | | | |
| HARDWARE 940 | | | | |
| | ⏟ 995 | | | |

*FIG. 9*

MEMORY CACHE MANAGEMENT FOR GRAPHICS PROCESSING

BACKGROUND

This disclosure relates generally to the field of graphics processing. More particularly, but not by way of limitation, this disclosure relates to having a graphics processor, such as a graphics processing unit (GPU), managing memory cache by tagging and dropping data set identifiers (DSIDs) associated with cache lines.

Computers, mobile devices, and other computing systems typically have at least one programmable processor, such as a central processing unit (CPU) and other programmable processors specialized for performing certain processes or functions (e.g., graphics processing). Examples of a programmable processor specialized to perform graphics processing operations include, but are not limited to, a GPU, a digital signal processor (DSP), a field programmable gate array (FPGA), and/or a CPU emulating a GPU. GPUs, in particular, comprise multiple execution cores (also referred to as shader cores) designed to execute the same instruction on parallel data streams, making them more effective than general-purpose processors for operations that process large blocks of data in parallel. For instance, a CPU functions as a host and hands-off specialized parallel tasks to the GPUs. Specifically, a CPU can execute an application stored in system memory that includes graphics data associated with a video frame. Rather than processing the graphics data, the CPU forwards the graphics data to the GPU for processing; thereby, freeing the CPU to perform other tasks concurrently with the GPU's processing of the graphics data.

GPU processing, such as render-to-texture passes, often write and read from memory cache to improve performance and power saving. For instance, a render-to-texture pass renders a frame to a texture resource that can be later re-passed to a shader for further processing. By doing so, the GPU could be writing to and/or reading from the texture resource before the GPU is done utilizing the texture resource. Having the texture resource accessible within memory cache during this time period could improve GPU performance. However, the memory cache may be unaware of when a GPU is done utilizing the texture resource. In certain instances, while the GPU is still using the texture resource, the memory cache may persist data out to system memory (e.g., DRAM) causing a reduction in GPU performance.

SUMMARY

In one implementation, a method is disclosed to associate DSIDs for write commands and subsequently drop written data (if any) from the cache using the DSIDs. The example method creates a resource group for a plurality of graphics application program interface (API) resources, where each graphics API resource corresponds to a memory allocation for storing data that is accessible to a graphics processor. The example method encodes a set command that references the resource group within a command buffer. The set command assigns a DSID to the resource group. A write command within the command buffer causes the graphics processor to write data within a cache line. The write command is also able to cause the written cache line to be associated with the DSID. A read command causes the graphics processor to read data written into the resource group. A drop command causes the graphics processor to notify the memory cache to drop, without flushing to memory, data stored within the written cache line associated with the DSID. The processor then commits one or more command buffers that include the set command, the write command, the read command, and the drop command for execution on the graphics processor.

In another implementation, a system for utilizing write commands and drop commands, where the system comprises memory and a processor operable to interact with the memory. The processor is able to encode a set command that references a resource group within a command buffer. The set command assigns a DSID to the resource group that includes a plurality of graphics API resources. The processor is also able to encode a write command within the command buffer that causes the graphics processor to write data within the cache line. The write command also causes the DSID to be marked to the written cache line. A drop command is encoded to cause the graphics processor to notify the memory cache to delete, without evicting to memory, data stored within the written cache line marked with the DSID. The processor then commits one or more command buffers that include the set command, the write command, and the drop command for execution on the graphics processor.

In yet another implementation, a system for associating DSIDs for write commands and subsequently drop written data (if any) from the cache lines using the DSIDs. The system comprises memory and a graphics processor operable to interact with the memory. The graphics processor obtains from one or more command buffers a write command and a drop command, both of which are associated with a DSID. The graphics processor executes the write command to write data within the cache line to generate a dirty cache line in a memory cache. The DSID corresponds to a resource group that includes a plurality of graphics API resources and the write command marks the DSID to the dirty cache line. Afterwards, the graphics processor executes, after the write command, the drop command to notify the memory cache to drop the written data within the dirty cache line. The data is dropped without flushing the dirty cache line to main memory.

In yet another implementation, each of the above described methods, and variation thereof, may be implemented as a series of computer executable instructions. Such instructions may use any one or more convenient programming language. Such instructions may be collected into engines and/or programs and stored in any media that is readable and executable by a computer system or other programmable control device.

BRIEF DESCRIPTION OF THE DRAWINGS

While certain implementations will be described in connection with the illustrative implementations shown herein, this disclosure is not limited to those implementations. On the contrary, all alternatives, modifications, and equivalents are included within the spirit and scope of this disclosure as defined by the claims. In the drawings, which are not to scale, the same reference numerals are used throughout the description and in the drawing figures for components and elements having the same structure, and primed reference numerals are used for components and elements having a similar function and construction to those components and elements having the same unprimed reference numerals.

FIG. 9 is a block diagram of an implementation of a software layer and architecture where implementations of the present disclosure may operate.

DETAILED DESCRIPTION

Figure 1:
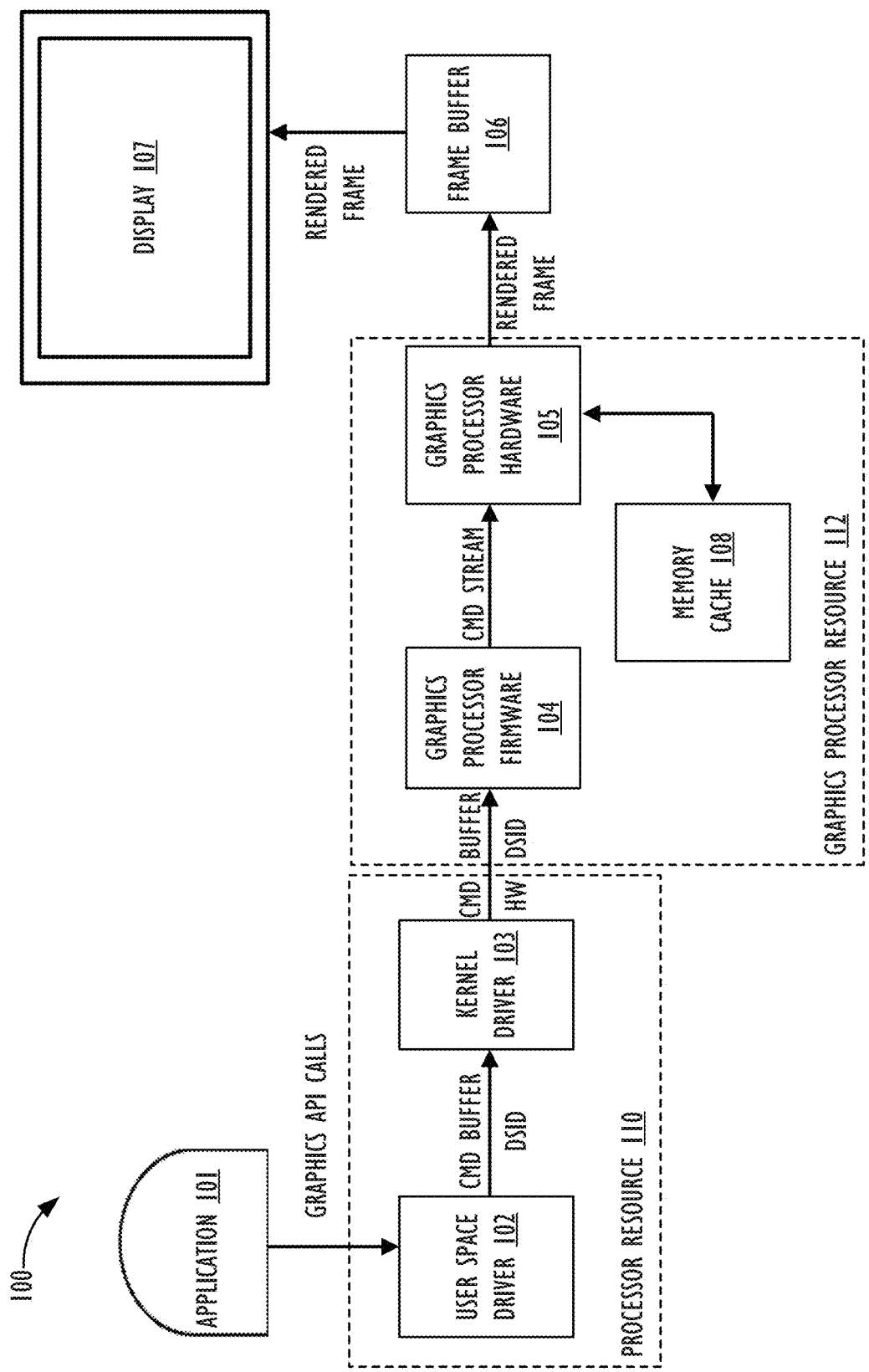
FIG. 1 is a diagram of a graphics processing path where implementations of the present disclosure may operate.

This disclosure includes various example implementations that assign a resource group to a DSID, associate the DSID to a cache line when writing to the resource group, and subsequently drop the DSID when an application no longer needs to access content in the resource group. In one implementation, a graphics API (e.g., OpenGL®, Direct3D®, or Metal® (OPENGL is a registered trademark of Silicon Graphics, Inc.; DIRECT3D is a registered trademark of Microsoft Corporation; and METAL is a registered trademark of Apple Inc.)) allows a developer and/or application to create a resource group that includes one or more resources (e.g., buffers and textures). The graphics API also allows a central processing unit (CPU) to generate one or more set commands within a command buffer to acquire a DSID for the created resource group. The command buffer could also include one or more write commands that mark and/or update a specific cache line within memory cache with the DSID when writing data into the resource group, one or more read commands for reading data from the resource group, and/or one or more drop commands for dropping the specific cache line associated with the DSID. After the CPU presents and commits the command buffer to the GPU for execution, the graphics driver schedules the set commands, write commands, read commands, and/or drop commands within the committed command buffer for the GPU to execute. When the GPU executes the drop command associated with the DSID, the GPU provides a drop hint to the memory cache for dropping data stored in the cache line that corresponds to the DSID without flushing the contents to system memory. The graphics API also allows a CPU to encode commands that assign and/or drop DSIDs for resource groups across different command buffers and/or across different command queues.

In the following description, for purposes of explanation, numerous specific details are set forth in order to provide a thorough understanding of the inventive concept. As part of this description, some of this disclosure's drawings represent structures and devices in block diagram form in order to avoid obscuring the disclosed principles. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one implementation" or to "an implementation" means that a particular feature, structure, or characteristic described in connection with the implementation is included in at least one implementation of the disclosure, and multiple references to "one implementation" or "an implementation" should not be understood as necessarily all referring to the same implementation.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

As used herein, the term "kernel" in this disclosure refers to a computer program that is part of a core layer of an operating system (e.g., Mac OSX™) typically associated with relatively higher or the highest security level. The "kernel" is able to perform certain tasks, such as managing hardware interaction (e.g., the use of hardware drivers) and handling interrupts for the operating system. To prevent application programs or other processes within a user space from interfering with the "kernel," the code for the "kernel" is typically loaded into a separate and protected area of memory. Within this context, the term "kernel" may be interchangeable throughout this disclosure with the term "operating system kernel."

The disclosure also uses the term "compute kernel," which has a different meaning and should not be confused with the term "kernel" or "operating system kernel." In particular, the term "compute kernel" refers to a program for a graphics processor (e.g., GPU, DSP, or FPGA). In the context of graphics processing operations, programs for a graphics processor are classified as a "compute kernel" or a "shader." The term "compute kernel" refers to a program for a graphics processor that performs general compute operations (e.g., compute commands), and the term "shader" refers to a program for a graphics processor that performs graphics operations (e.g., render commands).

As used herein, the term "command" in this disclosure refers to a graphics API command encoded within a data structure, such as command buffer or command list. The term "command" can refer to a render command (e.g., for draw calls) and/or a compute command (e.g., for dispatch calls) that a graphics processor is able to execute. Examples of commands pertinent to this disclosure that relate to managing memory cache include a "set command" that acquires a DSID for a created resource group, a "write command" (e.g., render command) that associates the DSID to a written cache line for the purpose of writing to a resource group, a "read command" (e.g., render command) that reads from the resource group and a "drop command" (e.g., render command) for notifying (e.g., a drop hint) a memory cache that it is able to drop the written cache line associated with the DSID.

For the purposes of this disclosure, the term "processor" refers to a programmable hardware device that is able to process data from one or more data sources, such as memory. One type of "processor" is a general-purpose processor (e.g., a CPU) that is not customized to perform specific operations (e.g., processes, calculations, functions, or tasks), and instead is built to perform general compute operations. Other types of "processors" are specialized processor customized to perform specific operations (e.g., processes, calculations, functions, or tasks). Non-limiting examples of specialized processors include GPUs, floating-point processing units (FPUs), DSPs, FPGAs, application-specific integrated circuits (ASICs), and embedded processors (e.g., universal serial bus (USB) controllers).

As used herein, the term "graphics processor" refers to a specialized processor for performing graphics processing operations. Examples of "graphics processors" include, but are not limited to, a GPU, DSPs, FPGAs, and/or a CPU emulating a GPU. In one or more implementations, graphics processors are also able to perform non-specialized operations that a general-purpose processor is able to perform. As previously presented, examples of these general compute operations are compute commands associated with compute kernels.

As used herein, the term "resource" refers to an allocation of memory space for storing data that is accessible to a graphics processor, such as a GPU, based on a graphics API. For the purpose of this disclosure, the term "resource" is synonymous and can also be referenced as "graphics API resource." Examples of graphics API resources include buffers and textures. Buffers represent an allocation of unformatted memory that can contain data, such as vertex, shader, and compute state data. Textures represents an allocation of memory for storing formatted image data. The term "resource group" refers to a data structure that contains a list of resources that are logically grouped together for an interim time period. In one implementation, the resource group is an immutable list of resources where a resource cannot be added to or removed from the resource group once an application creates the resource group.

FIG. 1 is a diagram of a graphics processing path 100 where implementations of the present disclosure may operate. FIG. 1 illustrates an example in which the graphics processing path 100 utilizes a processor resource 110 and a graphics processor resource 112. The processor resource 110 includes one or more general-purpose processors (e.g., CPUs), where each processor has one or more cores. The processor resource 110 can also contain and/or communicate with memory, microcontrollers, and/or any other hardware resources a processor may utilize to process commands for graphics processor resource 112 to execute. The graphics processor resource 112 includes one or more graphics processors (e.g., GPUs), where each graphics processor has one or more execution cores and other computing logic for performing graphics and/or general compute operations. Stated another way, the graphics processor resource 112 may also encompass and/or communicate with memory (e.g., memory cache 108), and/or other hardware resources to execute programs, such as shaders or compute kernels. For example, graphics processor resource 112 is able to process shaders with a rendering pipeline and compute kernels with a compute pipeline.

FIG. 1 illustrates that application 101 generates graphics API calls for the purpose of encoding commands for the graphics processor resource 112 to execute. To generate the graphics API calls, application 101 includes code written with a graphics API. The graphics API (e.g., Metal®) represents a published and/or standardized graphics library and framework that define functions and/or other operations that application 101 is able to have with a graphics processor. For example, the graphics API allows application 101 to be able to control the organization, processing, and submission of render and compute commands, as well as the management of associated data and resources for those commands.

In one or more implementations, application 101 is a graphics application that invokes the graphics API to convey a description of a graphics scene. Specifically, the user space driver 102 receives graphics API calls from application 101 and maps the graphics API calls to operations understood and executable by the graphics processor resource 112. For example, the user space driver 102 can translate the API calls into commands encoded within command buffers before being transferred to kernel driver 103. The translation operation may involve the user space driver 102 compiling shaders and/or compute kernels into commands executable by the graphics processor resource 112. The command buffers are then sent to the kernel driver 103 to prepare the command buffers for execution on the graphics processor resource 112. As an example, the kernel driver 103 may perform memory allocation and scheduling of the command buffers to be sent to the graphics processor resource 112. For the purpose of this disclosure and to facilitate ease of description and explanation, unless otherwise specified, the user space driver 102 and the kernel driver 103 are collectively referred to as a graphics driver.

FIG. 1 illustrates that the graphics processor firmware 104 obtains command buffers that processor resource 110 commits for execution. The graphics processor firmware 104 can perform a variety of operations to manage the graphics processor hardware 105 that includes powering up the graphics processor hardware 105 and/or scheduling the order of commands that the graphics processor hardware 105 receives for execution. With reference to FIG. 1 as an example, the graphics processor firmware 104 can be implemented by a microcontroller that executes the graphics processor firmware 104. Specifically, the microcontroller could be embedded in the same package as a graphics processor within the graphic processor resource 112 and setup to pre-process commands for the graphics processor. In other implementations, the microcontroller is physically separated from the graphics processor.

After scheduling the commands, in FIG. 1, the graphics processor firmware 104 sends command streams to the graphics processor hardware 105. The graphics processor hardware 105 then executes the commands within the command streams according to the order the graphics processor hardware 105 receives the commands. The graphics processor hardware 105 includes multiple (e.g., numerous) execution cores, and thus, can execute a number of received commands in parallel. The graphics processor hardware 105 then outputs rendered frames to frame buffer 106. In one implementation, the frame buffer 106 is a portion of memory, such as a memory buffer, that contains a bitmap that drives display 107. Display 107 subsequently accesses the frame buffer 106 and converts (e.g., using a display controller) the rendered frame (e.g., bitmap) to a video signal for display.

In one or more implementations, the graphics processing path 100 is also able to support creating resource groups, assigning a DSID to the created resource group, associating the DSID to a cache line with a write command, and dropping the DSID for the created resource group. In FIG. 1, application 101 may generate a graphics API call to create a resource group that logically groups resources (e.g., buffers and textures) for a certain time period. The graphics API also allows processor resource 110 to generate a set command within a command buffer to acquire and assign a DSID for the created resource group. The command buffer could also include a write command tagged with a DSID to write data into the resource group, a read command to read data from the resource group, and/or a drop command for dropping the cache line associated with the assigned DSID.

After the processor resource 110 commits the command buffer to the graphics processor resource 112, the graphics driver schedules the set command, write command, read command, and/or drop command for execution. When the graphics processor resource 112 executes the drop command that references the DSID, the graphics processor hardware 105 notifies memory cache 108 that the memory cache 108 no longer needs to store the contents within the given cache line. As a result, the memory cache 108 can drop contents within the given cache line that corresponds to the DSID. When the memory cache 108 drops contents in the cache line, the memory cache 108 invalidates the contents stored in the cache line such that the cache line's contents are not flushed to memory that is mapped to the memory cache (e.g., main memory).

In one or more implementations, the memory cache 108 includes a cache controller (not shown in FIG. 1) that accesses the actual blocks of memory cache. The drop notification the graphics processor hardware 105 sends to the memory cache 108 acts as a drop hint. The cache controller drops content stored in the corresponding cache line if the memory cache 108 still stores the contents and has not previously evicted the contents to system memory. In some instances, the memory cache 108 has already evicted contents stored in the cache line prior to receiving the drop hint from the graphics processor hardware 105. When this occurs, the cache controller does not drop content stored in the memory cache 108 in response to receiving the drop notification. For the purpose of this disclosure, the term "flush" can also be referred throughout this disclosure as "persist" or "evict."

The user space driver 102 is configured to manage and assign the DSIDs to resource groups. DSIDs represent a set of virtual identifiers that are eventually associated with cache lines. When the user space driver 102 receives an API call to set a resource group, the user space driver 102 acquires and assigns a DSID to a created resource group. For example, the user space driver 102 may initially have available a total of about 64,000 DSIDs to assign to a created resource group. The user space driver 102 acquires one of the available DSIDs (e.g., a DSID not allocated to another resource group) and assign the available DSID to the created resource group. As shown in FIG. 1, the user space driver 102 then produces the DSID associated with the resource group within the set command to the kernel driver 103.

In one or more implementations, after receiving the set command from the user space driver 102, the kernel driver 103 assigns the DSID received from the user space driver 102 to a hardware DSID. The DSID that the user space driver 102 assigns to the created resource group, thus, acts as a virtual identifier that the kernel driver 103 then maps to a hardware DSID. The kernel driver 103 may also maintain other mappings between other hardware DSIDs and other DSIDs allocated to other resource groups. The kernel driver 103 may also track work (e.g., kicks) submitted to graphics processor resource 112 that utilize the hardware DSID. The kernel driver 103 provides the hardware DSIDs and work tracking information to the graphics processor firmware 104. The graphics processor firmware 104 may utilize the hardware DSIDs and work tracking information to manage operations between the graphics processor hardware 105 and memory cache 108. For example, the graphics processor firmware 104 may dictate when the graphics processor hardware 105 accesses memory cache 108 for a given hardware DSID and manage when to initiate a drop notification to the memory cache 108 for a given hardware DSID.

After a set command assigns the created resource group to a DSID and hardware DSID, application 101 references the created resource group by tagging the DSID within other commands in the command buffer (e.g., write command and read command). The user space driver 102 subsequently passes the other commands tagged with the DSID to the kernel driver 103. For write commands, the user space driver 102 may also tag an address range with the DSID. In one or more implementations, the address range could have a range start and end address that is about 128 bytes long. The user space driver 102 is responsible for ensuring that the address ranges for each DSID does not overlap. Afterwards, the kernel driver 103 determines the hardware DSID that maps to the DSID and forwards the tagged commands with the hardware DSID to the graphics processor resource 112. The graphics processor resource 112 then executes the tagged commands using the hardware DSID.

When application 101 issues a write command for a resource group, one or more cache lines in memory cache 108 that store the written content for the resource group becomes associated with DSID and hardware DSID. The hardware DSID represents the identifier the graphics processor hardware 105 uses to generate a notification to the memory cache 108 to drop contents within the corresponding cache line. Cache line is a term of art understood by skilled artisans that refers to a block of memory that is transferred to or from a memory cache 108. A cache line could have a fixed data size when transferring data to or from memory cache 108. For example, the cache line could bet set to include multiple bytes and/or words of data, where a whole cache line is read from or written to during a data transfer. A hardware DSID may correspond to or be part of tags, indexes, or other address information used to identify a cache line.

When application 101 is done utilizing a resource group, application 101 may initiate a drop command for the purposes of notifying memory cache 108 that contents stored in a cache line can be dropped (e.g., deleted or marked as available to be overwritten) from the memory cache 108 without evicting the contents to a mapped memory location in main memory. After the user space driver 102 receives the drop command for a given DSID, the user space driver 102 may include the given DSID associated with the drop command within a list of DSIDs that can be dropped from the memory cache 108. The user space driver 102 subsequently sends the list of DSIDs to the kernel driver 103. The kernel driver 103 and graphics processor firmware 104 manages and schedules drop operations for the list of DSIDs such that drop operations do not occur until the graphics processor resource 112 completes write and read commands associated with a given DSID. Once the graphics processor resource 112 completes a drop operation, the user space driver 102 and the kernel driver 103 are able to free up and reuse the given DSID and mapped hardware DSID, respectively, for new set commands.

Although FIG. 1 illustrates a specific implementation of graphics processing path 100, the disclosure is not limited to the specific implementation illustrated in FIG. 1. For instance, graphics processing path 100 may include other frameworks, APIs, and/or application layer services not specifically shown in FIG. 1. As an example, application 101 may have access to Core Animation to animate views and/or user interfaces for application 101. FIG. 1 also does not illustrate all of the hardware resources and/or components that graphics processing path 100 may utilize (e.g., power management units or memory resources, such as system memory). Additionally or alternatively, even though FIG. 1 illustrates that processor resource 110 and graphics processor resource 112 are separate devices, other implementations could have the processor resource 110 and graphics processor resource 112 integrated on a single device (e.g., a system-on-chip). The use and discussion of FIG. 1 is only an example to facilitate ease of description and explanation.

Figure 2:
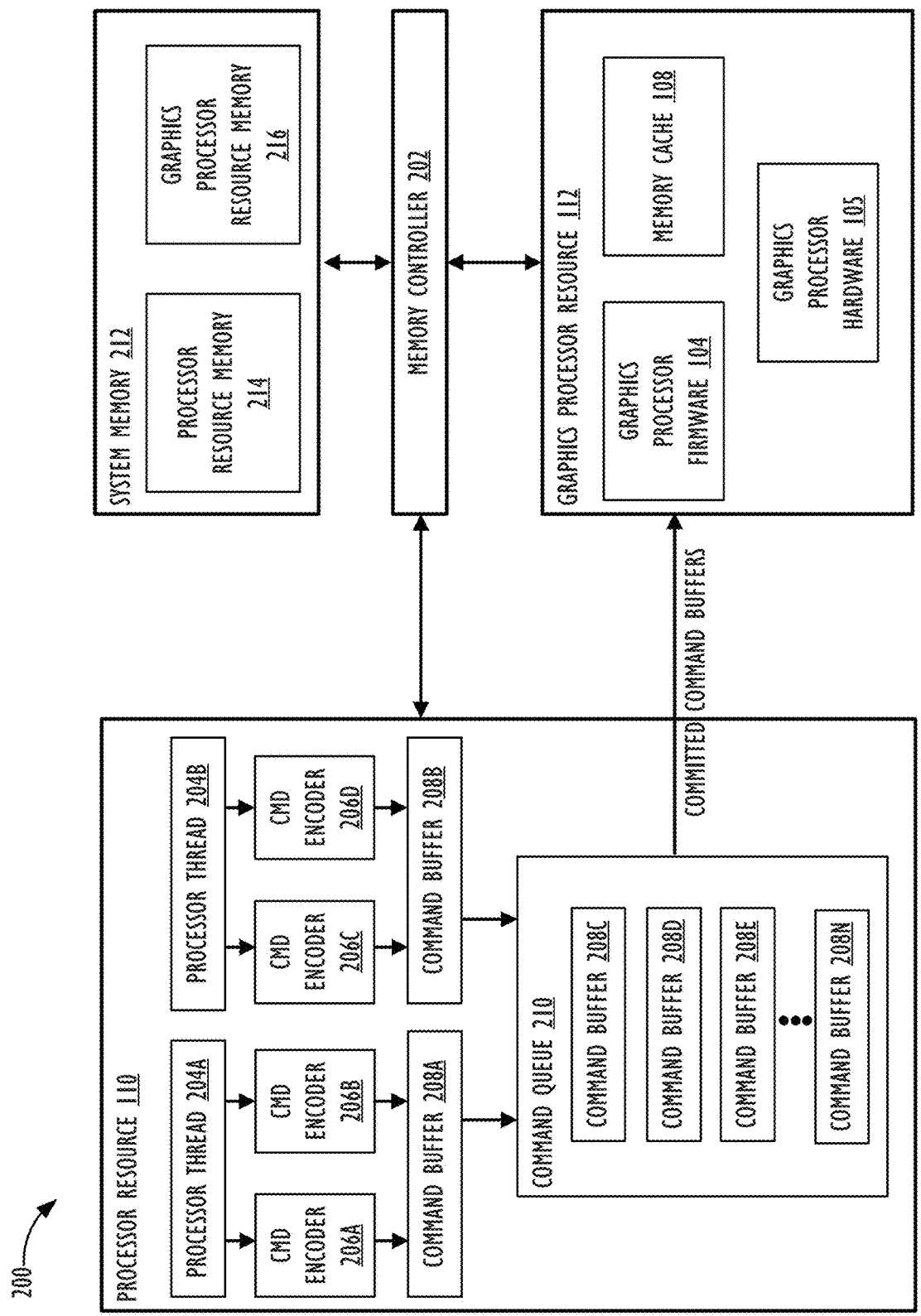
FIG. 2 is a block diagram of a system where implementations of the present disclosure may operate.

FIG. 2 is a block diagram of a system 200 where implementations of the present disclosure may operate. Specifically, system 200 is able to implement the graphics processing path 100 shown in FIG. 1. FIG. 2 illustrates that system 200 includes a processor resource 110 and a graphics processor resource 112. FIG. 2 illustrates processor threads 204A and 204B. Processor thread 204A is tasked with utilizing command encoders 206A and 206B and processor thread 204B is tasked with utilizing command encoder 206C and 206D. The command encoders 206A and 206B encode commands within command buffer 208A and command encoders 206C and 206D encode commands within command buffer 208B. A different number of processor threads and command encoders can be included in other implementations compared to two processor threads and four command encoders shown in the example of FIG. 2. The command encoders 206A-206D represents encoders that encodes commands into command buffers 208A and 208B for the graphics processor resource 112 to execute. Examples of command encoder types include, but are not limited to, Blit command encoders (e.g., graphics API resource copy and graphics API resource synchronization commands), compute command encoders (e.g., compute commands), and render command encoders (e.g., render commands).

Command buffers 208A and 208B, which are also referred to as "command lists," represent data structures that store a sequence of encoded commands for graphics processor resource 112 to execute. When one or more graphics API calls present and commit command buffers 208A and 208B to a graphics driver (e.g., the user space driver 102 shown FIG. 1), the processor resource 110 organizes the command buffers 208A and 208B into a command queue 210. The command queue 210 organizes the order in which command buffers 208 are sent to graphics processor resource 112 for execution. Using FIG. 2 as an example, command queue 210 contains command buffers 208C-208N, where command buffer 208C is at the top of the command queue 210 and is the next command buffer 208C to be sent to graphics processor resource 112 for execution. When processor resource 110 commits command buffers 208A and 208B for execution, the processor resource 110 is unable to encode any additional commands into command buffers 208A and 208B. After committing a command buffer 208, the command buffer becomes available to the graphics processor resource 112 for execution.

The example of FIG. 2 also illustrates that processor resource 110 and graphics processor resource 112 bilaterally communicate with a memory controller 202. The memory controller 202 manages the flow of information to and from system memory 212 and is sometimes tasked with maintaining system memory 212 itself (e.g., refresh or other functionality depending upon the type of memory). As shown in FIG. 2, a single memory controller 202 performs memory control for both the processor resource 110 and graphics processor resource 112. In another implementation, the memory controller 202 includes separate memory controllers, one memory control for processor resource 110 and another memory controller for graphics processor resource 112. The memory controller 202 bilaterally communicates with system memory 212, which may be divided into processor resource memory 214 and graphics processor resource memory 216. Some implementations of system memory 212 use physically or logically independent memory for each of the processor resource 110 and graphics processor resource 112, while other implementations call for sharing system memory 212 on a physical or logical basis.

Using FIG. 2 as an example, processor resource 110 is able to generate a set command within a command buffer 208 (e.g., 208C) to acquire a DSID for a created resource group. The same command buffer 208 (e.g., 208C) could also include a write command that is tagged with the DSID for writing data into the resource group, read command for reading data from the resource group, and/or a drop command for dropping the cache line associated with the DSID. In another implementation, different command buffers 208 (e.g., 208C, 208D, and/or 208E) could include a write command, read command, and drop command that reference the same DSID. After processor resource 110 commits the command buffers 208 to graphics processor resource 112, the graphics driver schedules the DSID commands for execution on the graphics processor resource 112.

When the graphics processor resource 112 executes the drop command associated with the DSID, the graphics processor hardware 105 notifies memory cache 108 that it is able to invalidate the contents stored in the corresponding cache line such that the cache line contents do not need to be evicted out to system memory 212. The graphics processor hardware 105 does not guarantee the contents within the memory cache are actually dropped, but instead provides a drop hint to memory cache 108 that the application is done with the contents identified by the DSID. For example, after memory cache 108 receives the drop hint from the graphics processor hardware 105, if memory cache 108 still contains the content that corresponds to the DSID, then memory cache 108 drops the cache line (e.g., a dirty cache line) without flushing the contents to system memory 212. In some instances, memory cache 108 is unable drop the cache line that corresponds to the DSID when memory cache 108 has already persisted the cache line to system memory 212, or specifically, graphics processor resource memory 216. A "dirty cache line" refers to a modified cache line that has not been modified in a memory mapped to the memory cache (e.g., main memory or system memory 212). Stated another way, the data stored in the cache line differs from its counterpart stored in system memory 212.

Having a graphics API that supports creating a resource group, allocating a DSID to the resource group, associating a DSID with write commands that reference the resource group, and dropping the DSID referencing the resource group could provide performance and power benefits. In particular, exposing memory cache management to an application for graphics processing could reduce bandwidth usage. For instance, having the graphics processor continuously access memory cache 108 rather than system memory 212 to perform render-to-texture passes reduces that bandwidth usage for running an application. An overall reduction in bandwidth usage translates to increases in performance for bandwidth bound type operations and reduces power consumption. Issuing drop hints to memory cache 108 to delete cache content prior to persisting the content into system memory also provides additional power savings. Consumption of less power also produces less heat from system 200. In one implementation, system 200 is subject to thermal mitigation operations that reduce frequencies and power to system 200. By do so, the thermal mitigation operations causes system 200 to enter a reduced performance state.

Although FIG. 2 illustrates a specific implementation of a system 200 to associate DSIDs for write commands and subsequently drop written data (if any) from memory cache 108 using the DSIDs, the disclosure is not limited to the specific implementation illustrated in FIG. 2. For instance, even though FIG. 2 illustrates a single command queue 210; persons of ordinary skill in the art are aware that command buffers 208 can be placed into other command queues 210 not shown in FIG. 2. The use and discussion of FIG. 2 is only an example to facilitate ease of description and explanation.

Figure 3:
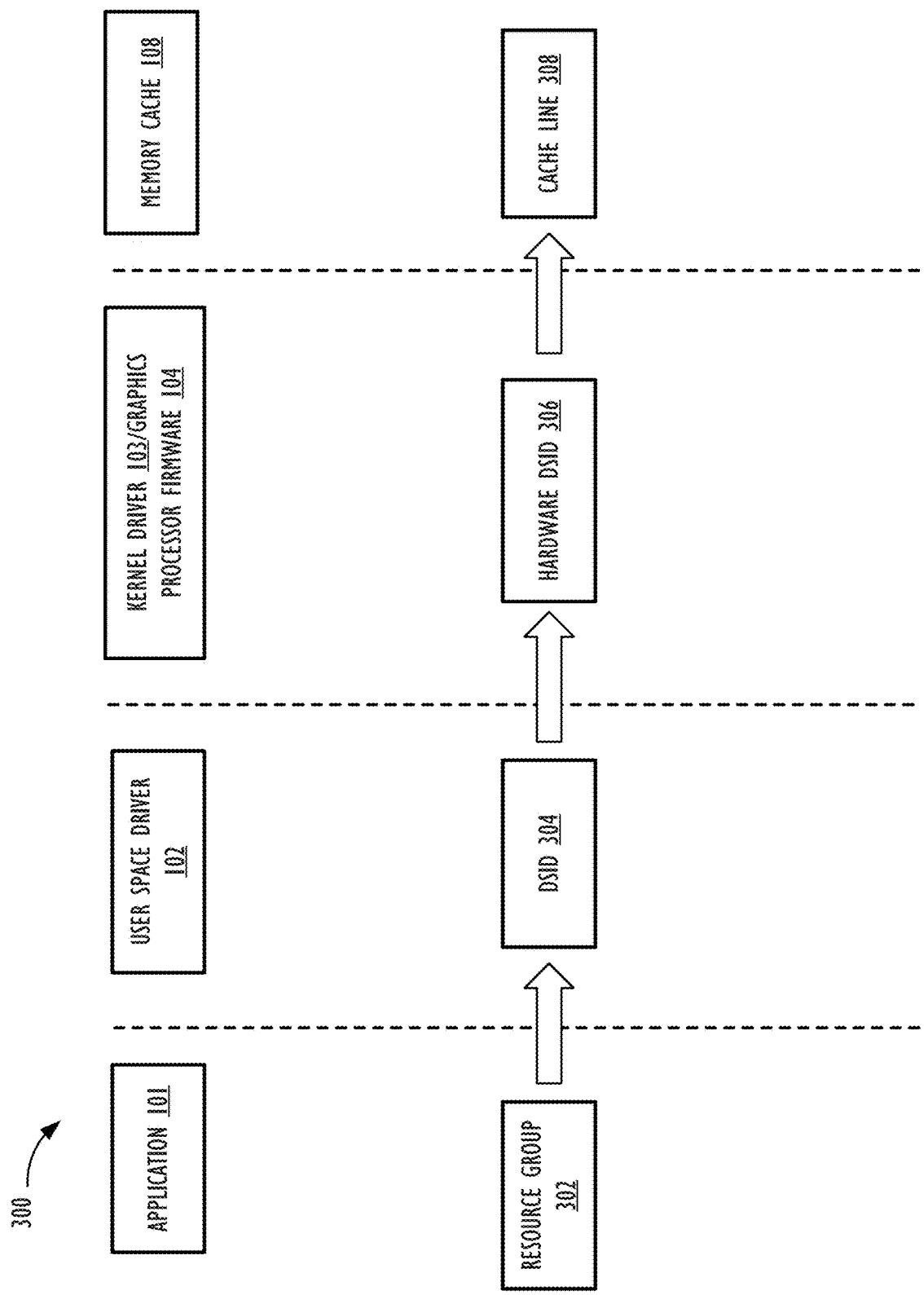
FIG. 3 is a block diagram of a memory virtualization architecture for managing memory cache when assigning, associating, and dropping a DSID for a resource group.

FIG. 3 is a block diagram of a memory virtualization architecture 300 for managing memory cache when assigning, tagging, and dropping a DSID for a resource group. FIG. 3 illustrates that application 101 creates a resource group 302 that includes one or more resources. One or more resources within resource group 302 may also belong to other resource groups 302 the application 101 previously created. After creating resource group 302, application 101 may send a graphics API call to set resource group 302 to user space driver 102. In response to the graphics API call, user space driver 102 assigns a DSID 304 to resource group 302. For example, the user space driver 102 may initially have available a total of about 64,000 DSIDs to assign to resource group 302. Based on the graphics API call to set resource group 302, the user space driver 102 assigns one of the available DSID (e.g., a DSID not allocated to another resource group) to the resource group 302.

The kernel driver 103 then maps the DSID 304 to a hardware DSID 306. By doing so, DSID 304 acts as a virtual identifier that the kernel driver 103 then maps to a hardware DSID 306. Having a memory virtualization architecture 300 that maps DSID 304 to hardware DSID 306 allows the graphics API architecture of managing and assigning DSID 304 to be separate and independent from the hardware architecture for managing and assigning hardware DSID 306. For example, if the architecture for managing and assigning hardware DSID 306 for the graphics processor changes because of redesigned hardware in the graphics processor, no substantial revisions may need to be made the graphics API architecture.

As previously disclosed, the kernel driver 103 may also maintain other mappings between other hardware DSIDs 306 and other DSIDs 304 allocated to other resource groups 302. The graphics processor firmware 104 may receive the hardware DSID from kernel driver 103 to manage operations between a graphics processor and memory cache 108. As an example, the graphics processor firmware 104 may determine when to initiate a drop notification to the memory cache 108 for a given hardware DSID. Based on the graphics processor firmware 104, the graphics processor is able to communicate with the memory cache 108 to access cache line 308 associated with the hardware DSID 306. As an example, the graphics processor may read, write, and/or drop contents from a cache line associated with the hardware DSID 306. Recall that a hardware DSID 306 may correspond to or be part of tags, indexes, or other address information used to identify a cache line.

After executing a set command, the DSID 304 and hardware DSID 306 may become associated with cache line 308 based on a write command for resource group 302. Application 101 may generate a write command that writes data into resource group 302. If the write command causes at least some of the data for resource group 302 to be written within cache line 308, the write command is also able to associate the DSID 304 and hardware DSID 306 to the written cache line 308. Stated another way, DSID 304 and hardware DSID 306 are used to mark cache line 308 updated with the write command for resource group 302. In one or more implementations, the DSID 304 and hardware DSID 306 can be associated with more than one relevant cache line 308. Afterwards, DSID 304 and hardware DSID 306 can be later used to drop any cache lines associated with the two identifiers.

In one or more implementations, the user space driver 102 and/or the kernel driver 103 may allocate a default DSID 304 and/or a default hardware DSID 306, respectively (e.g., a value zero for DSID 304 and/or hardware DSID 306). A default DSID 304 and default hardware DSID 306 each represent an identifier that instructs a graphics processor to treat resource group 302 as a normal cache line within memory cache 108. In other words, resource groups 302 that are assigned with the default DSID 304 and/or default hardware DSID 306 do not benefit from the tag and drop operations previously discussed with reference to FIGS. 1 and 2. One situation where the use of default DSID 304 and/or default hardware DSID 306 arises when the user space driver 102 and/or the kernel driver 103 do not have any available DSID 304 and/or hardware DSID 306 to assign after receiving the set command. Additionally or alternatively, a default hardware DSID 306 may be useful when one or more resources belong to multiple resource groups 302. Within the memory virtualization architecture 300, application 101 in some instances may inadvertently set two resource groups 302 that have at least one common resource. Rather than having a graphics processor assign a different hardware DSID 306 to each resource group 302, the graphics processor may classify setting the two resource groups 302 as a programming error and set the hardware DSID 306 for both resource groups 302 to a default hardware DSID 306.

Figure 4:
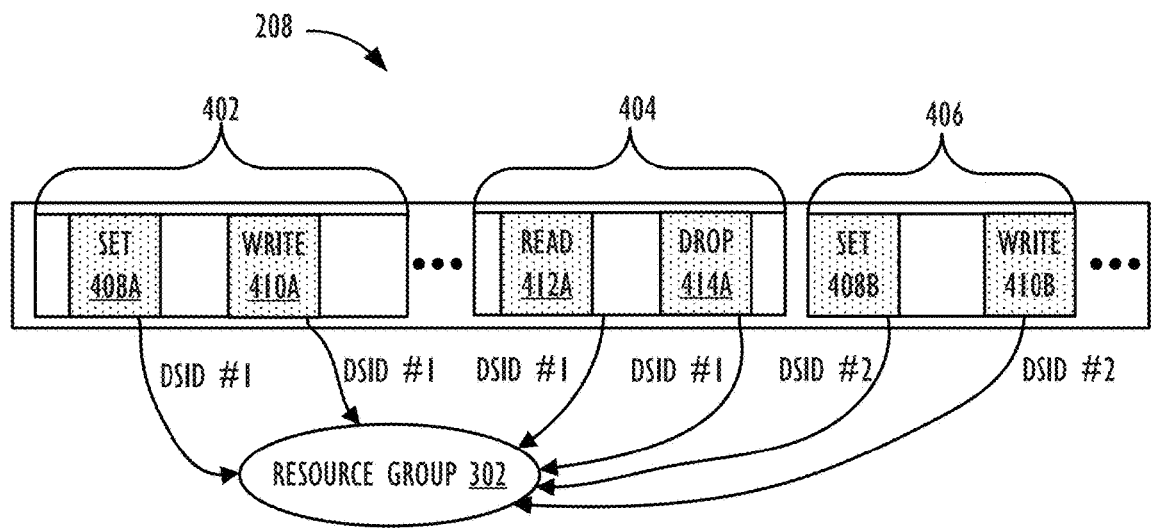
FIG. 4 is an implementation of a command buffer that includes DSID commands that reference a created resource group.

FIG. 4 is an implementation of a command buffer 208 that includes one or more set commands 408, one or more write commands 410, one or more read commands 412, and one or more drop commands 414 that reference a created resource group. Recall that a general-purpose processor (e.g., a CPU) presents and commits a command buffer 208 for execution on a graphics processor. After the general-purpose processor commits the command buffer 208, the general-purpose processor is unable to encode additional commands into the command buffer 208. FIG. 4 depicts that a command buffer 208 includes set commands 408A and 408B, write commands 410A and 410B, read command 412A, and drop command 414A that reference a created resource group 302. The command buffer 208 includes three different sections 402, 404, and 406. Section 402 represents commands that a command encoder encodes to command buffer 208; section 404 represents commands that a different command encoder (e.g., a render command encoder) encodes to command buffer 208; and section 406 represents commands that another command encoder encodes to command buffer 208. Each command encoder may be associated with specific graphics API resources (e.g., buffers and textures) and states (e.g., stencil state and pipeline state) for encoding the commands within each section 402, 404, and 406 of command buffer 208.

With reference to FIG. 4, the set command 408A allows a developer and/or application to indicate that at least a portion of the command buffer 208 will operate on a referenced resource group 302. Within sections 402 and 404, the command buffer 208 includes a set command 408A that assigns a DSID (e.g., DSID #1) to a created resource group 302, a write command 410A that writes data into the referenced resource group 302, a read command that reads data from the referenced resource group 302, and a drop command that drops the DSID associated with the resource group 302. The command encoder that encodes commands into section 402 tags the write command 410A with the allocated DSID (e.g., DSID #1) and an address range for the resource group 302. Subsequent command encoders also inherit DSID state information and will tag the DSID (e.g., DSID #1) to commands referencing resource group 302. As an example, read command 412A is also tagged with the DSID #1 to identify resource group 302. Having the read command 214A tagged with the allocated DSID protects against accessing dropped data because of hardware-level same-command buffer parallelism. Command encoders that encode commands to command buffer 208 inherit the DSID state information until executing drop command 414.

A command buffer 208 can include multiple write and reads from a created resource group 302. In one implementation, after drop command 414, if an application and/or developer desires to write and read back into the same resource group 302, the application and/or developer issues another API call to set the resource group 302 again. Using FIG. 4 as an example, because of drop command 414A, the command encoder that encodes commands within section 406 does not inherit the DSID state that the set command 408A establishes. Instead, after drop command 414A, the command encoder encodes a second set command 408B, which assigns a new DSID (e.g., DSID #2) to resource group 302. The command encoder uses the same DSID state information that corresponds to the second set command 408B and tags the new DSID (e.g., DSID #2) with write command 410B.

Figure 5:
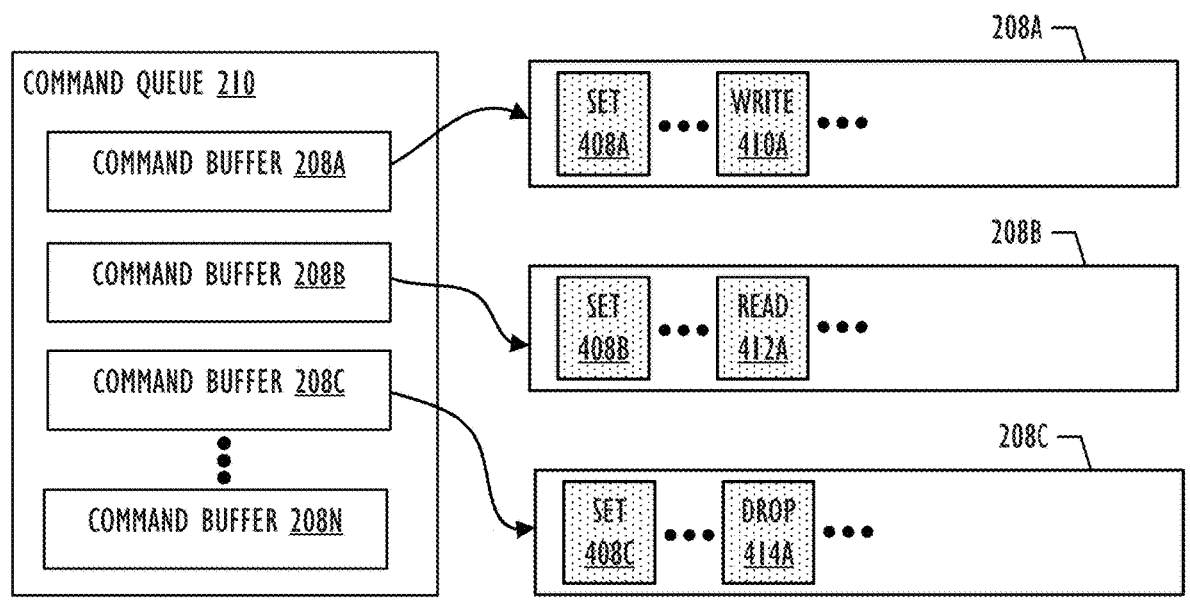
FIG. 5 is an implementation of referencing a created resource group across multiple command buffers within a command queue.

FIG. 5 is an implementation of referencing a created resource group across multiple command buffers 208A, 208B, and 208C within a command queue 210. Multiple command buffers 208 may include DSID commands that reference the same created resource group. In FIG. 5, because DSID state information does not get inherited across command buffers, each command buffer 208 includes a set command 408 prior to implementing other commands that reference the resource group. Similar to FIG. 4, at least a portion of the command buffer inherits the DSID state information associated with set command 408. In comparison to FIG. 4, FIG. 5 illustrates that the write command 410A, read command 412A, and drop command 414A are located on different command buffer 208A, 208B, and 208C, respectively, rather than a single command buffer 208.

As shown in FIG. 5, each command buffer 208A, 208B, and 208C includes its own set command 408A, 408B, and 408C, respectively, since DSID state information does not get inherited across command buffers 208. Specifically, within command buffer 208A, the set command 408A assigns a DSID (e.g., DSID #1) to the created resource group and the write command 410A, which occurs after set command 408A, is tagged with the assigned DSID (e.g., DSID #1) for writing into the resource group. Command buffer 208B, which a graphics processor subsequently executes after executing command buffer 208A, includes a set command 408B that assigns the DSID (e.g., DSID #1) to the created resource group. The read command 412A is tagged with the assigned DSID (e.g., DSID #1) for writing into the resource group. Command buffer 208C, which the graphics processor executes after executing command buffer 208B, includes a set command 408C that assigns the DSID (e.g., DSID #1) to the created resource group. The drop command 414A references the assigned DSID (e.g., DSID #1) for providing a drop hint to the memory cache to delete contents within the cache line that corresponds to the assigned DSID.

Figure 6:
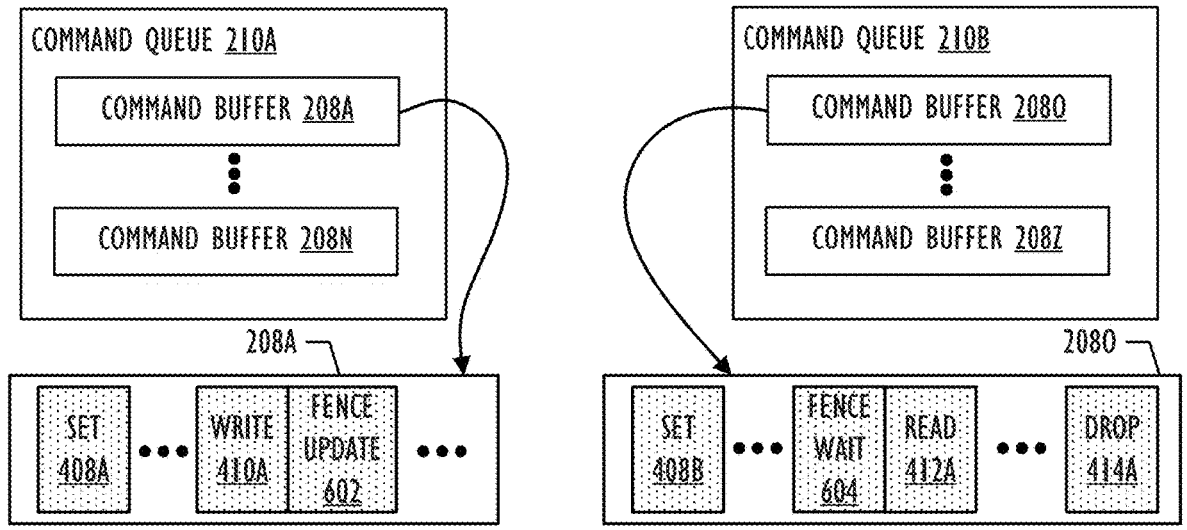
FIG. 6 is an implementation of referencing a created resource group across multiple command queues.

FIG. 6 is an implementation of referencing a created resource group across multiple command queues 210. In comparison to FIG. 5, FIG. 6 illustrates that the write command 410A is located in a command buffer 208A within command queue 210A, and drop command 414A is located in a different command buffer 208O in a different command queue 210B. As shown in FIG. 6, each command buffer 208A and 208O includes its own set command 408A and 408B since different command buffers do not inherit DSID state information. A command encoder places a fence update command 602 after the write command 410A within command buffer 208A since the read command 412A is located in a different command queue 210. In command buffer 208O, a fence wait command 604 is placed before read command 412A and drop command 414A indicating that the write command 410A in command queue 210A executes prior to executing the read command 412A located in command queue 210B.

In FIG. 6, an application may insert a fence update command 602 and fence wait command 604 to track and manage resource dependencies across command queues 210. Resource dependencies arise as resources are produced and consumed by different commands, regardless of whether those commands are encoded to the same command queue 210 or different command queues 210. The fence wait command 604 captures a graphics processor's work up to a specific point in time. When the graphics processor encounters the fence wait command 604, the graphics processor waits until relevant captured work is completed (e.g., receives a corresponding a fence update command 602) before continuing execution.

Although FIGS. 4-6 illustrate specific implementations of command buffers 208 that include DSID commands, the disclosure is not limited to the specific implementation illustrated in FIGS. 4-6. For instance, even though FIG. 4 illustrates two set commands 408A and 408B, other implementations of command buffer 208 could include more than two set commands 408 or single set command 408 that references resource group 302. For FIG. 5, other implementations of command buffers 208A, 208B, and 208C could each include more than one set command 408, write command 410, read command 412, or drop command 414. The use and discussion of FIGS. 4-6 is only an example to facilitate ease of description and explanation.

Figure 7:
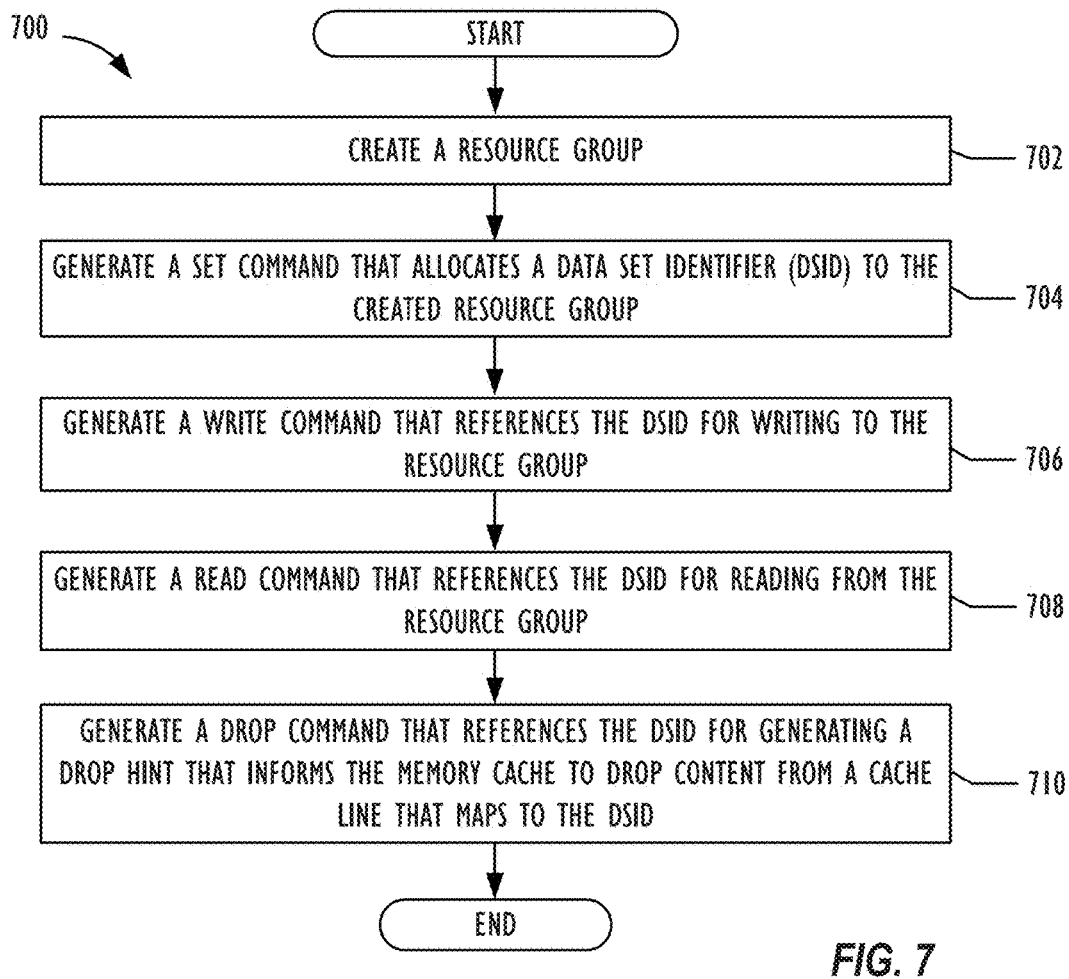
FIG. 7 depicts a flowchart illustrating a graphics processing operation for managing memory cache for graphics processing.

FIG. 7 depicts a flowchart illustrating a graphics processing operation 700 for managing memory cache for graphics processing. To manage memory cache, operation 700 is able to generate DSID commands that reference a resource group within a single command buffer, across multiple command buffers, or across multiple command queues. In one implementation, operation 700 may be implemented by processor resource 110 shown in FIGS. 1 and 2. For example, blocks within operation 700 could be implemented by the user space driver 102 and/or kernel driver 103 shown in FIG. 1. The use and discussion of FIG. 7 is only an example to facilitate explanation and is not intended to limit the disclosure to this specific example. As an example, block 702 may be optional such that operation 700 may not perform block 702 each time operation 700 assigns, tags, and drops a DSID for a referenced resource group.

Operation 700 may start at block 702 and create a resource group. Operation is able to create a resource group using a variety operations that include, but are not limited to creating a new resource group, copying an existing resource group, or performing a mutable copy of an existing resource group. Operation 700 then moves to block 704 and generates a set command that allocates a DSID to the created resource group. Using FIGS. 4-6, the set command may occur before a write command, before a read command, and/or before a drop command. In one or more implementations, operation 700 may have previously generated a set command in another command buffer (e.g., within the same command queue or different command queue). As previously discussed in FIG. 3, operation 700, based on the set command, may utilize a memory virtualization architecture to map the DSID to a hardware DSID. Having a memory virtualization architecture that maps DSID 304 to hardware DSID 306 allows the graphics API architecture of managing and assigning DSID 304 to be separate and independent from the hardware architecture for managing and assigning hardware DSID 306.

At block 706, operation 700 generates, within a command buffer, a write command that references the DSID for writing to the resource group. As previously discussed, at block 704, operation 700 assigns the DSID to a resource group. Based on the DSID assignment, if the write command causes at least some of the data for the resource group to be written into one or more cache lines, operation 700 associates the DSID to the cache lines. Operation 700 then moves block 708 and generates a read command referencing the DSID for reading from the resource group. In implementations where the read command is located on the same command buffer as the set command, the read command inherits DSID state information from the set command. In instances where the read command is located on a different command buffer, operation 700 may generate an additional set command (not shown in FIG. 7) prior to generating the read command within the different command buffer. Additionally, operation 700 may generate a fence waiting command before the read command for situations where the write command generated in block 706 is located in a different command queue than the read command generated in block 708.

After completing block 708, operation 700 may then move to block 710 and generate a drop command that references the created DSID. The drop command generates a drop hint that informs memory cache to drop content from a cache line that maps to the DSID. Stated another way, operation 700 does not guarantee that the drop command causes the memory cache to drop content within the identified cache line, but instead notifies the memory cache that an application is done with the contents identified by the DSID. For example, after memory cache receives a drop hint from the operation 700, if memory cache still contains the content that corresponds to the DSID, then memory cache drops the cache line (e.g., a dirty cache line) without flushing the contents to system memory. Alternatively, memory cache does not drop contents within the cache line that corresponds to the DSID in situations where the memory cache has already persisted the cache line to system memory. Once, a graphics processor completes executing the drop command, the DSID becomes available to reassign to a subsequent set command.

Illustrative Hardware and Software

The disclosure may have implication and use in and with respect to variety of electronic devices, including single- and multi-processor computing systems, and vertical devices (e.g., cameras, gaming systems, appliances, etc.) that incorporate single- or multi-processing computing systems. The discussion herein is made with reference to a common computing configuration for many different electronic computing devices (e.g., computer, laptop, mobile devices, etc.). This common computing configuration may have a CPU resource including one or more microprocessors and a graphics processing resource including one or more GPUs. Other computing systems having other known or common hardware configurations (now or in the future) are fully contemplated and expected. While the focus of some of the implementations relate to mobile systems employing minimized GPUs, the hardware configuration may also be found, for example, in a server, a workstation, a laptop, a tablet, a desktop computer, a gaming platform (whether or not portable), a television, an entertainment system, a smart phone, a phone, or any other computing device, whether mobile or stationary, vertical, or general purpose.

Figure 8:
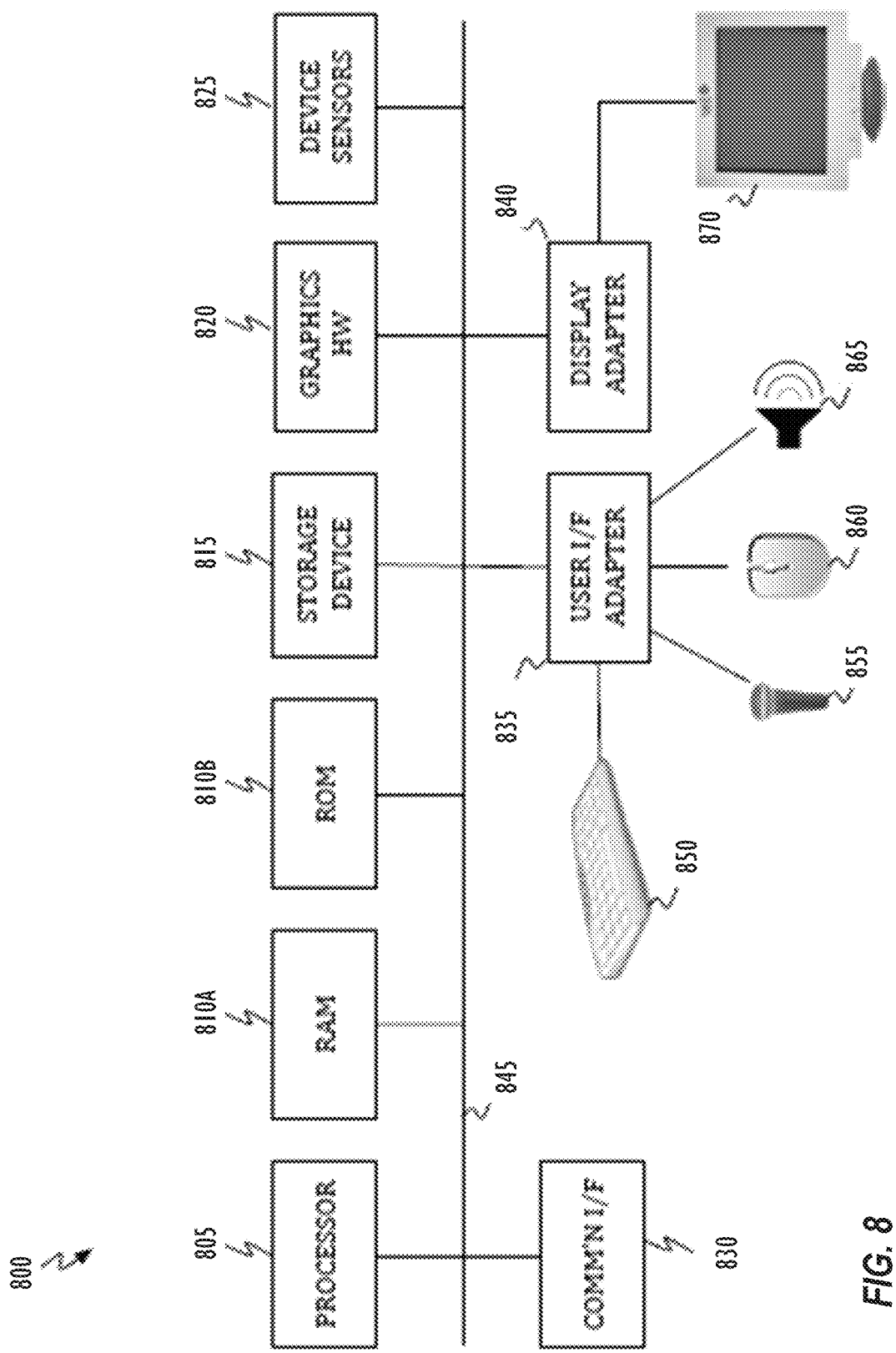
FIG. 8 is a block diagram of a computing system where implementations of the present disclosure may operate.

Referring to FIG. 8, the disclosed implementations may be performed by representative computing system 800. For example the representative computer system may act as an end-user device or any other device that produces or displays graphics. For example, computing system 800 may be embodied in electronic devices, such as a general purpose computer system, a television, a set top box, a media player, a multi-media entertainment system, an image processing workstation, a hand-held device, or any device that may be coupled with or may incorporate display or presentation devices as discussed herein. Computing system 800 may include one or more processors 805, memory 810 (810A and 810B), one or more storage devices 815, and graphics hardware 820 (e.g., including one or more graphics processors). Computing system 800 may also have device sensors 825, which may include one or more of: depth sensors (such as a depth camera), 3D depth sensor(s), imaging devices (such as a fixed and/or video-capable image capture unit), RGB sensors, proximity sensors, ambient light sensors, accelerometers, gyroscopes, any type of still or video camera, LIDAR devices, SONAR devices, microphones, CCDs (or other image sensors), infrared sensors, thermometers, etc. These and other sensors may work in combination with one or more GPUs, DSPs or conventional microprocessors along with appropriate programming so the sensor outputs may be properly interpreted and/or combined and interpreted.

Returning to FIG. 8, system 800 may also include communication interface 830, user interface adapter 835, and display adapter 840—all of which may be coupled via system bus, backplane, fabric or network 845. Memory 810 may include one or more different types of non-transitory media (e.g., solid-state, DRAM, optical, magnetic, etc.) used by processor 805 and graphics hardware 820. For example, memory 810 may include memory cache, read-only memory (ROM), and/or random access memory (RAM). Storage 815 may include one or more non-transitory storage media including, for example, magnetic disks (fixed, floppy, and removable) and tape, optical media such as CD-ROMs and digital video disks (DVDs), and semiconductor memory devices such as Electrically Programmable Read-Only Memory (EPROM), solid state storage drives, and Electrically Erasable Programmable Read-Only Memory (EEPROM). Memory 810 and storage 815 may be used to retain media data (e.g., audio, image, and video files), preference information, device profile information, computer program instructions organized into one or more modules and written in any desired computer programming language, and any other suitable data. When executed by processor 805 and/or graphics hardware 820, such computer program code may implement one or more of operations or processes described herein. In addition, the system may employ microcontrollers (not shown), which may also execute such computer program code to implement one or more of the operations or computer readable media claims illustrated herein. In some implementations, the microcontroller(s) may operate as a companion to a graphics processor or a general-purpose processor resource.

Communication interface 830 may include semiconductor-based circuits and may be used to connect computing system 800 to one or more networks. Illustrative networks include, but are not limited to: a local network, such as a USB network; a business's local area network; and a wide area network such as the Internet and may use any suitable technology (e.g., wired or wireless). Communications technologies that may be implemented include cell-based communications (e.g., LTE, CDMA, GSM, HSDPA, etc.) or other communications (Apple lightning, Ethernet, WiFi®, Bluetooth®, USB, Thunderbolt®, Firewire®, etc.). (WIFI is a registered trademark of the Wi-Fi Alliance Corporation. BLUETOOTH is a registered trademark of Bluetooth Sig, Inc. THUNDERBOLT and FIREWIRE are registered trademarks of Apple Inc.). User interface adapter 835 may be used to connect keyboard 850, microphone 855, pointer device 860, speaker 865, and other user interface devices such as a touchpad and/or a touch screen (not shown). Display adapter 840 may be used to connect one or more displays 870.

Processor 805 may execute instructions necessary to carry out or control the operation of many functions performed by computing system 800 (e.g., evaluation, transformation, mathematical computation, or compilation of graphics programs, etc.). Processor 805 may, for instance, drive display 870 and receive user input from user interface adapter 835 or any other user interfaces embodied by a system. User interface adapter 835, for example, can take a variety of forms, such as a button, a keypad, a touchpad, a mouse, a dial, a click wheel, a keyboard, a display screen, and/or a touch screen. In addition, processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 in performing computational tasks. In some implementations, graphics hardware 820 may include CPU-integrated graphics and/or one or more discrete programmable GPUs. Computing system 800 (implementing one or more implementations discussed herein) can allow for one or more users to control the same system (e.g., computing system 800) or another system (e.g., another computer or entertainment system) through user activity, which may include audio instructions, natural activity, and/or pre-determined gestures such as hand gestures.

Various implementations within the disclosure may employ sensors, such as cameras. Cameras and like sensor systems may include auto-focus systems to accurately capture video or image data ultimately used in a variety of applications, such as photo applications, augmented reality applications, virtual reality applications, and gaming. Processing images and performing recognition on the images received through camera sensors (or otherwise) may be performed locally on the host device or in combination with network accessible resources (e.g., cloud servers accessed over the Internet).

Returning to FIG. 8, device sensors 825 may capture contextual and/or environmental phenomena such as time; location information; the status of the device with respect to light, gravity, and the magnetic north; and even still and video images. In addition, network-accessible information such as weather information may also be used as part of the context. All captured contextual and environmental phenomena may be used to provide context to user activity or information about user activity. For example, in accessing a gesture or the expression or emotion of a user, the contextual information may be used as part of the analysis, and the analysis may be performed using the techniques discussed herein.

Output from the device sensors 825 may be processed, at least in part, by processors 805 and/or graphics hardware 820, and/or a dedicated image processing unit incorporated within or without computing system 800. Information so captured may be stored in memory 810 and/or storage 815 and/or any storage accessible on an attached network. Memory 810 may include one or more different types of media used by processor 805, graphics hardware 820, and device sensors 825 to perform device functions. Storage 815 may store data such as media (e.g., audio, image, and video files); metadata for media; computer program instructions; graphics programming instructions and graphics resources; and other software, including database applications (e.g., a database storing avatar frames), preference information, device profile information, and any other suitable data. Memory 810 and storage 815 may be used to retain computer program instructions or code organized into one or more modules in either compiled form or written in any desired computer programming language. When executed by, for example, a microcontroller, GPU or processor 805, such computer program code may implement one or more of the acts or functions described herein (e.g., interpreting and responding to user activity including commands and/or gestures).

As noted above, implementations within this disclosure include software. As such, a description of common computing software architecture is provided as expressed in a layer diagram in FIG. 9. Like the hardware examples, the software architecture discussed here is not intended to be exclusive in any way, but rather to be illustrative. This is especially true for layer-type diagrams, which software developers tend to express in somewhat differing ways. In this case, the description begins with layers starting with the base hardware layer 995 illustrating hardware layer 940, which may include memory, general purpose processors, graphics processors, microcontrollers, or other processing and/or computer hardware such as memory controllers and specialized hardware. Above the hardware layer is the operating system kernel layer 990 showing an example as operating system kernel 945, which is kernel software that may perform memory management, device management, and system calls. The operating system kernel layer 990 is the typical location of hardware drivers, such as a graphics processor drivers. The notation employed here is generally intended to imply that software elements shown in a layer use resources from the layers below and provide services to layers above. However, in practice, all components of a particular software element may not behave entirely in that manner.

Returning to FIG. 9, operating system services layer 985 is exemplified by operating system services 950. Operating system services 950 may provide core operating system functions in a protected environment. In addition, operating system services shown in operating system services layer 985 may include frameworks for OpenGL®/OpenCL® 951, CUDA® or the like, Metal® 952, user space drivers 953, and a Software Rasterizer 954. (OPENGL is a registered trademark of Silicon Graphics International Corporation.

OPENCL is a registered trademark of Apple Inc. CUDA is a registered trademark of NVIDIA Corporation.) While most of these examples all relate to graphics processor processing or graphics and/or graphics libraries, other types of services are contemplated by varying implementations of the disclosure. These particular examples also represent graphics frameworks/libraries that may operate in the lower tier of frameworks, such that developers may use shading and primitives and/or obtain fairly tightly coupled control over the graphics hardware. In addition, the particular examples named in FIG. 9 may also pass their work product on to hardware or hardware drivers, such as the graphics processor driver, for display-related material or compute operations.

Referring again to FIG. 9, OpenGL®/OpenCL® 951 represent examples of well-known libraries and application programming interfaces for graphics processor compute operations and graphics rendering including 2D and 3D graphics. Metal® 952 also represents a published graphics library and framework, but it is generally considered lower level than OpenGL/OpenCL 951, supporting fine-grained, low-level control of the organization, processing, and submission of graphics and computation commands, as well as the management of associated data and resources for those commands. User space drivers 953 is software relating to the control of hardware that exists in the user space for reasons that are typically related to the particular device or function. In many implementations, user space drivers 953 work cooperatively with kernel drivers and/or firmware to perform the overall function of a hardware driver. Software Rasterizer 954 refers generally to software used to make graphics information such as pixels without specialized graphics hardware (e.g., using only the CPU). These libraries or frameworks shown within the operating system services layer 985 are only exemplary and intended to show the general level of the layer and how it relates to other software in a sample arrangement (e.g., kernel operations usually below and higher-level applications services 960 usually above). In addition, it may be useful to note that Metal® 952 represents a published framework/library of Apple Inc. that is known to developers in the art. Furthermore, OpenGL®/OpenCL® 951 may represent frameworks/libraries present in current versions of software distributed by Apple Inc.

Above the operating system services layer 985 there is an application services layer 980, which includes Sprite Kit 961, Scene Kit 962, Core Animation 963, Core Graphics 964, and other applications services 960. The operating system services layer 985 represents higher-level frameworks that are commonly directly accessed by application programs. In some implementations of this disclosure the operating system services layer 985 includes graphics-related frameworks that are high level in that they are agnostic to the underlying graphics libraries (such as those discussed with respect to operating system services layer 985). In such implementations, these higher-level graphics frameworks are meant to provide developer access to graphics functionality in a more user/developer friendly way and allow developers to avoid work with shading and primitives. By way of example, Sprite Kit 961 is a graphics rendering and animation infrastructure made available by Apple Inc. Sprite Kit 961 may be used to animate textured images or "sprites." Scene Kit 962 is a 3D-rendering framework from Apple Inc. that supports the import, manipulation, and rendering of 3D assets at a higher level than frameworks having similar capabilities, such as OpenGL. Core Animation 963 is a graphics rendering and animation infrastructure made available from Apple Inc. Core Animation 963 may be used to animate views and other visual elements of an application. Core Graphics 964 is a two-dimensional drawing engine from Apple Inc., which provides 2D rendering for applications.

Above the application services layer 980, there is the application layer 975, which may comprise any type of application program. By way of example, FIG. 9 shows three specific applications: photos 971 (a photo management, editing, and sharing program), Quicken® 972 (a financial management program), and iMovie® 973 (a movie making and sharing program). (QUICKEN is a registered trademark of Intuit Inc. IMOVIE is a registered trademark of Apple Inc.). Application layer 975 also shows two generic applications 970 and 974, which represent the presence of any other applications that may interact with or be part of the inventive implementations disclosed herein. Generally, some implementations of the disclosure employ and/or interact with applications that produce displayable and/or viewable content or produce computational operations that are suited for GPU processing.

In evaluating operating system services layer 985 and applications services layer 980, it may be useful to realize that different frameworks have higher- or lower-level application program interfaces, even if the frameworks are represented in the same layer of the FIG. 9 diagram. The illustration of FIG. 9 serves to provide a general guideline and to introduce exemplary frameworks that may be discussed later. Furthermore, some implementations of the disclosure may imply that frameworks in application services layer 980 make use of the libraries represented in operating system services layer 985. Thus, FIG. 9 provides intellectual reinforcement for these examples. Importantly, FIG. 9 is not intended to limit the types of frameworks or libraries that may be used in any particular way or in any particular implementation. Generally, many implementations of this disclosure relate to the ability of applications in layer 975 or frameworks in layers 980 or 985 to divide long continuous graphics processor tasks into smaller pieces. In addition, many implementations of the disclosure relate to graphics processor (e.g., GPU) driver software in operating system kernel layer 990 and/or embodied as microcontroller firmware in hardware layer 995; such drivers performing a scheduling function for the graphics processor resource (e.g., GPU).

Figure 10:
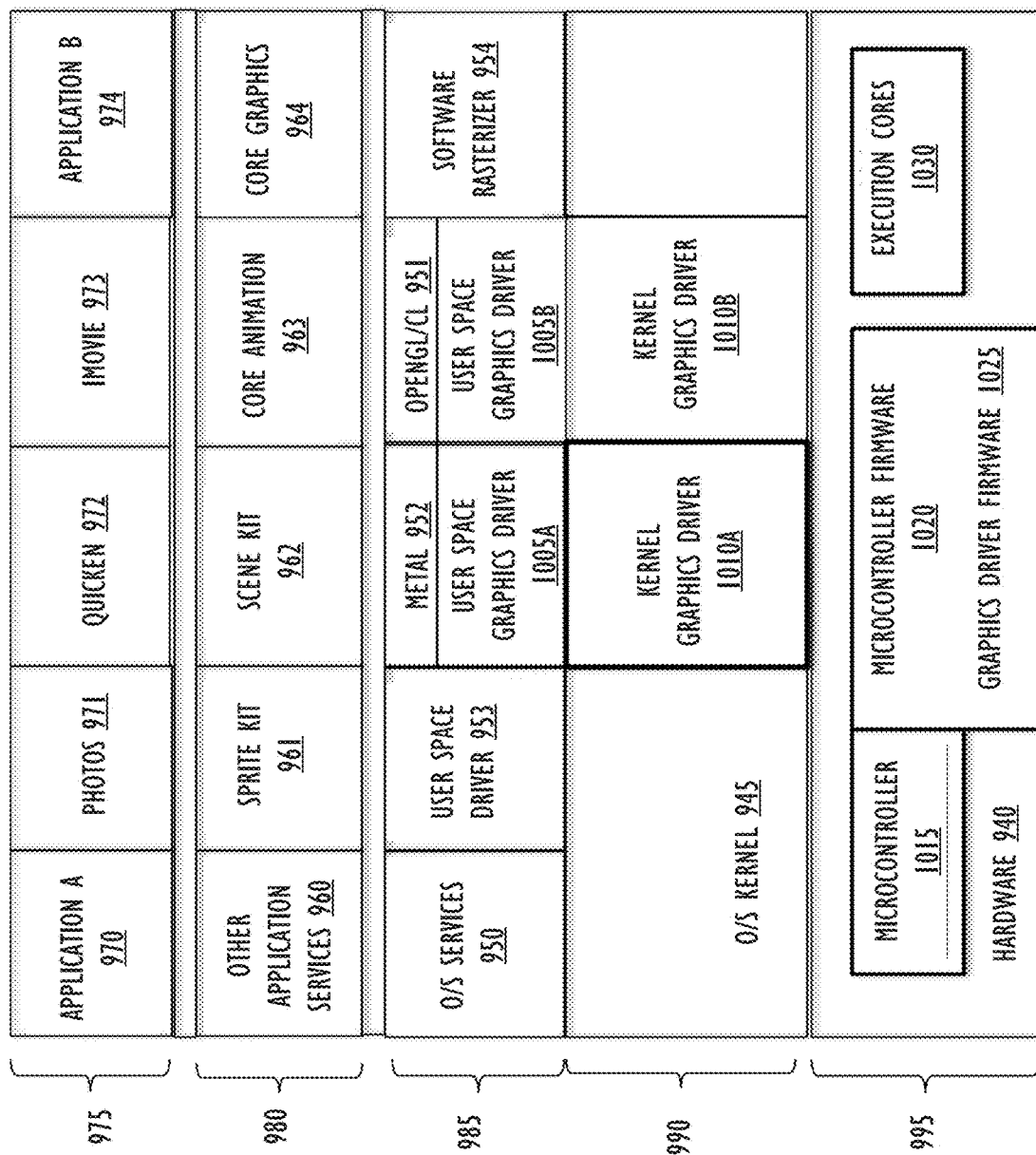
FIG. 10 is a block diagram of another implementation of a software layer and architecture where implementations of the present disclosure may operate.

FIG. 10 illustrates a software architecture similar to the standard architecture shown in FIG. 9. By way of distinction, the architecture of FIG. 10 shows: user space graphics drivers 1005A and 1005B; kernel graphics drivers 1010A and 1010B in the operating system kernel 945; a microcontroller 1015, accompanied by microcontroller firmware 1020, including graphics driver firmware 1025 in the hardware layer 940; and execution cores 1030 in the hardware layer 940. The presence of multiple instances of a graphics driver (user space graphics drivers 1005A and 1005B, kernel graphics drivers 1010A and 1010B, and graphics driver firmware 1025 in the microcontroller firmware 1020) indicates the various options for implementing the graphics driver. As a matter of technical possibility any of the three shown drivers might independently operate as a sole graphics driver. In some implementations of the disclosure, the overall graphics driver is implemented in a combination of kernel graphics drivers 1010A and 1010B and graphics driver firmware 1025 (e.g., in the operating system kernel 945 and the microcontroller firmware 1020, respectively). In other implementations, the overall graphics driver may be implemented by the combined effort of all three shown drivers 1005A and 1005B, 1010A and 1010B, and 1025.

At least one implementation is disclosed and variations, combinations, and/or modifications of the implementation(s) and/or features of the implementation(s) made by a person having ordinary skill in the art are within the scope of the disclosure. Alternative implementations that result from combining, integrating, and/or omitting features of the implementation(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means±10% of the subsequent number, unless otherwise stated.

Many other implementations will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A non-transitory program storage device, readable by a processor and comprising instructions stored thereon to cause the processor to:
   create a resource group for a plurality of graphics application program interface (API) resources, wherein each graphics API resource corresponds to a memory allocation for storing data that is accessible to a graphics processor;
   encode a set command that references the resource group within a command buffer, wherein the set command causes a data set identifier (DSID) to be associated with the resource group;
   encode a write command that references the resource group within the command buffer that causes the graphics processor to write data into a cache line within a memory cache, wherein the write command causes the cache line to be associated with the DSID;
   encode a read command that causes the graphics processor to read data written into the resource group, wherein the write command and the read command are encoded within different command buffers;
   encode a drop command that causes the graphics processor to notify the memory cache to drop, without flushing to memory, data stored within the cache line; and
   commit one or more command buffers that include the set command, the write command and the drop command for execution on the graphics processor.

2. The non-transitory program storage device of claim 1, wherein the instructions further cause the processor to:
   encode a second set command within a second command buffer of the one or more command buffers; and
   encode the read command within the second command buffer.

3. The non-transitory program storage device of claim 1, wherein the drop command is encoded within a second command buffer.

4. The non-transitory program storage device of claim 3, wherein the command buffer is sorted within a first queue and the second command buffer is sorted within a second queue.

5. The non-transitory program storage device of claim 4, wherein the instructions further cause the processor to:
   encode a fence update command after the write command within the command buffer in the first queue; and
   encode a fence wait command before the drop command within the second command buffer in the second queue.

6. The non-transitory program storage device of claim 1, wherein the drop command is associated with the DSID that references the resource group, and wherein the drop command causes the graphics processor to notify the memory cache to drop data stored within the cache line associated with the DSID.

7. A system comprising:
   memory; and
   a processor operable to interact with the memory, and configured to:
     encode a set command that references a resource group within a command buffer, wherein the set command causes a data set identifier (DSID) to be associated with the resource group that includes a plurality of graphics application program interface (API) resources;
     encode a write command that references the resource group within the command buffer that causes a graphics processor to write data into a cache line within a memory cache, wherein the write command causes the DSID to be tagged with the cache line;
     encode a second set command within a second command buffer;
     encode a read command within the second command buffer, wherein the read command causes the graphics processor to read data written into the resource group;
     encode a drop command that references the DSID and causes the graphics processor to notify the memory cache to delete, without evicting to memory, data stored within the cache line; and
     commit one or more command buffers that include the set command, the write command, and the drop command for execution on the graphics processor.

8. The system of claim 7, wherein the processor is further configured to:
   encode a read command that causes the graphics processor to read data written into the resource group.

9. The system of claim 8, wherein the drop command is associated with the DSID that references the resource group, and wherein the drop command causes the cache line tagged with the DSID to be dropped.

10. The system of claim 7, wherein the drop command is encoded within the second command buffer.

11. The system of claim 7, wherein the command buffer is sorted within a first queue, and the second command buffer is sorted within a second queue.

12. The system of claim 11, wherein the processor is further configured to:
    encode a fence update command after the write command within the command buffer in the first queue; and
    encode a fence wait command before the drop command within the second command buffer in the second queue.

13. The system of claim 7, wherein the processor is further configured to:
    reuse the DSID after the graphics processor completes the execution of the drop command.

14. A non-transitory program storage device, readable by a processor and comprising instructions stored thereon to cause the processor to:
    obtain from one or more command buffers that includes a write command and a drop command that are associated with a data set identifier (DSID), wherein the DSID is associated with a resource group that includes a plurality of graphics application program interface (API) resources and a cache line in a memory cache;

execute the write command to write data within the cache line to generate a dirty cache line, wherein the write command is encoded within a first command buffer of the one or more command buffers, and wherein the write command causes the cache line to be associated with the DSID; and execute, after the write command, the drop command to notify the memory cache to drop the written data within the dirty cache line, wherein the drop command is encoded within a second command buffer of the one or more command buffers, and wherein the written data is dropped without flushing the dirty cache line to main memory.

15. The non-transitory program storage device of claim 14, wherein the processor is a graphics processing unit (GPU) and the command buffers are encoded by a central processing unit (CPU).

16. The non-transitory program storage device of claim 14, wherein the drop command is associated with the DSID that references the resource group, and wherein the drop command causes the cache line associated with the DSID to be dropped.

17. The non-transitory program storage device of claim 14, wherein the first command buffer is sorted within a first queue and the second command buffer is sorted within a second queue.

18. The non-transitory program storage device of claim 17, wherein the instructions further cause the processor to:
encode a fence update command after the write command within the command buffer in the first queue; and
encode a fence wait command before the drop command within the second command buffer in the second queue.

19. The non-transitory program storage device of claim 14, wherein the drop command causes the processor to notify the memory cache to drop data stored within the cache line associated with the DSID.

20. The non-transitory program storage device of claim 14, wherein the instructions further cause the processor to:
reuse the DSID after the processor completes the execution of the drop command.

\* \* \* \* \*